United States Patent [19]

Tallentire et al.

[11] Patent Number: 5,747,110
[45] Date of Patent: *May 5, 1998

[54] POROUS WEBS

[75] Inventors: Alan Tallentire, Wilmslow; Colin Samuel Sinclair, Manchester, both of United Kingdom

[73] Assignee: Bowater Packaging Limited, London, United Kingdom

[*] Notice: The term of this patent shall not extend beyond the expiration date of Pat. No. 5,004,645.

[21] Appl. No.: 256,377

[22] PCT Filed: Jan. 14, 1993

[86] PCT No.: PCT/GB93/00070

§ 371 Date: Sep. 8, 1994

§ 102(e) Date: Sep. 8, 1994

[87] PCT Pub. No.: WO93/14265

PCT Pub. Date: Jul. 22, 1993

[30] Foreign Application Priority Data

Jan. 14, 1992 [GB] United Kingdom ............... 9200683

[51] Int. Cl.⁶ ............... B05D 1/12; B05D 3/12; B05D 5/00

[52] U.S. Cl. ............... 427/244; 427/158; 427/199; 427/203; 427/348; 427/365

[58] Field of Search ............... 427/157, 243, 427/244, 208.8, 158, 348, 365, 180, 199, 203

[56] References Cited

U.S. PATENT DOCUMENTS

| | | | |
|---|---|---|---|
| 3,413,139 | 11/1968 | Rasmussen et al. | 427/348 |
| 3,607,348 | 9/1971 | Wray et al. | 427/391 |
| 3,850,667 | 11/1974 | Tani et al. | 427/152 |
| 3,914,358 | 10/1975 | Dixon et al. | 427/401 |
| 4,051,275 | 9/1977 | Forestek | 427/348 |
| 4,210,488 | 7/1980 | Reuss et al. | 427/158 |
| 4,239,714 | 12/1980 | Sparks et al. | 264/129 |
| 4,356,113 | 10/1982 | Lim et al. | 252/455 Z |
| 4,548,609 | 10/1985 | Schöne | 427/158 |
| 4,663,163 | 5/1987 | Hou et al. | 210/645 |
| 4,794,002 | 12/1988 | Henis et al. | 427/245 |
| 4,800,190 | 1/1989 | Smolik | 502/416 |
| 4,816,074 | 3/1989 | Raythatha | 427/361 |
| 4,885,218 | 12/1989 | Andou et al. | 427/243 |
| 4,894,101 | 1/1990 | Sachetti | 427/157 |
| 5,004,645 | 4/1991 | Tallentire et al. | 427/244 |
| 5,124,101 | 6/1992 | Hirao et al. | 252/62 |
| 5,126,215 | 6/1992 | Aonuma et al. | 427/130 |

FOREIGN PATENT DOCUMENTS

| | | |
|---|---|---|
| 93386 | 4/1949 | New Zealand . |
| 153951 | 10/1964 | New Zealand . |
| 190384 | 5/1978 | New Zealand . |
| 208238 | 5/1984 | New Zealand . |
| 220136 | 5/1986 | New Zealand . |
| 222713 | 1/1987 | New Zealand . |
| 225060 | 6/1987 | New Zealand . |
| 233956 | 6/1989 | New Zealand . |
| 234055 | 6/1989 | New Zealand . |
| 236353 | 12/1989 | New Zealand . |
| 237935 | 8/1990 | New Zealand . |
| 244494 | 10/1991 | New Zealand . |

*Primary Examiner*—Diana Dudash
*Attorney, Agent, or Firm*—Larson & Taylor

[57] ABSTRACT

A method of coating porous webs wherein porous materials having a range of pore sizes are given desired characteristics by selective depostion in the large pores of particulate treatment agents. Thus some characteristics are achievable by control variation of pore size distribution (e.g. sample, uniformity, liquid filtration properties) while others depend on specific attributes of the treatment agents (e.g. response to calendaring, catalysis, security marking adhesion properties).

13 Claims, 6 Drawing Sheets

POROUS WEBS

The present invention relates to porous webs having desired characteristics; to methods of producing such webs; and to uses thereof.

EP-A-0272798 (DRG) describes barrier products which prevent the passage of airborne micro-organisms therethrough whilst still retaining air permeability. These barrier products are produced by treating an air permeable product (eg paper) having a range of pore sizes with a particulate pore modifying agent (preferably of at least one substantially uniform size range) under conditions such that the pore modifying agent is selectively incorporated in the pores at the upper end of the size range. As a result, the pore modifying agent provides (in the pores at the upper end of the size range) zones of high surface area which restrict the passage of micro-organisms through the material.

The treatment of the porous material may be effected by applying a pressure differential across the faces of the material, and treating the higher pressure side with a suspension or dispersion (most preferably an aerosol) of the pore modifying agent. The inertial conditions of this treatment process are an important factor in ensuring that the pore modifying agent is selectively incorporated in the pores at the upper end of the size range. The results are explained with reference to the structure of an idealised pore which extends from one side of the material to the other and which has a large chamber between the ends of the pore and also having one or more "constrictions", the smallest of which is the minimum cross-section of the pore which determines the pore size.

With the low inertia conditions the pore modifying agent follows the flow stream into a chamber of the pore and is captured within this chamber by Brownian motion. Under the medium inertia conditions, the momentum of the pore modifying agent is too great for Brownian motion capture with the result that the particles leave the flow stream and impact on the walls of the pore in the region of, and within, the constriction. Using high inertia conditions the pore modifying agent is unable to follow the flow stream and simply impacts onto the surface of the material to form a dusting.

For the purposes of providing an enhancement of barrier performance, the low inertia treatment condition is the highly preferred method. An improvement of barrier performance can also be obtained with the medium inertia treatment. However, the high inertia conditions do not improve barrier performance.

The sole aim of the disclosure in EP-A-0272798 is to provide an increase in barrier performance. We have however now established that porous materials (with a range of pore sizes) may be provided with other characteristics by incorporating selected particulate materials in the pores at the upper end of the size range.

According to a first aspect of the present invention there is provided a product which comprises a porous material having pores with a range of sizes and wherein over at least a part of the area of the material the pores at the upper end of the size range have incorporated selectively therein at least one particulate material chosen from (i) an agent which modifies at least one of the following properties of the material by effecting a change in pore size distribution:

maximum pore size;
pressure to cause liquid to pass through the material;
liquid filtration properties;
resistance to penetration to grease;
gas permeance;
vapour transmission;
printability; and/or coatability
(ii) a light scattering agent
(iii) an ion exchange resin
(iv) a catalyst
(v) a pigment, dye, or other marking agent
(vi) an agent that modifies the response to calendering
(vii) an odour removing agent
(viii) an adhesive agent
(ix) an absorbent agent A second aspect of the present invention provides a method of producing a product in accordance with the first aspect of the invention, the method comprising treating a porous material having pores with a range of sizes so as to incorporate selectively in those pores at the upper end of the size range over at least a part of the area of the material a particulate material as set out under at least one of (i)–(ix) above. The preferred treatment method is to establish a pressure differential across the material (eg. by applying a reduced pressure to one side thereof) and to treat the higher pressure side with a suspension or dispersion (eg. in air) in which the particulate material is the discontinuous phase. Most preferably the particulate material is used in the form of an aerosol having a size of 0.5 to 10 μm.

The term "pore size" as used herein has its conventional meaning, i.e. for a given pore it is the minimum cross-sectional size throughout the length of the pore, and may be determined by standard techniques.

The present invention has been based on our further work which has established that the incorporation of particulate material selectively in the pores at the upper end of the size range may be used to provide porous materials with particular desired characteristics which are alternative or additional to an enhancement of barrier properties.

The porous material which may be treated in accordance with the present invention includes any such material having pores with a range of sizes. The pore size range may, for example, be one defined by a log-normal distribution in which a small fraction of the total number of pores exhibit a markedly greater size as compared to the remainder. Such materials may for example be wet-laid or non wet-laid materials. Preferably the material is a woven or nonwoven material, eg. a paper, textile, mat, board or film (eg. a spun bonded film). The material may comprise fibres, eg. cellulosic fibres, synthetic fibres, mineral fibres and/or ceramic fibres. A wide range of specific weights of porous materials may be used.

Some embodiments of the invention will now be described in greater detail with reference to the accompanying drawings in which.

The treatment method in accordance with the second aspect of the invention may be effected using the method generally disclosed in EP-A-0272798.

Figure 1:
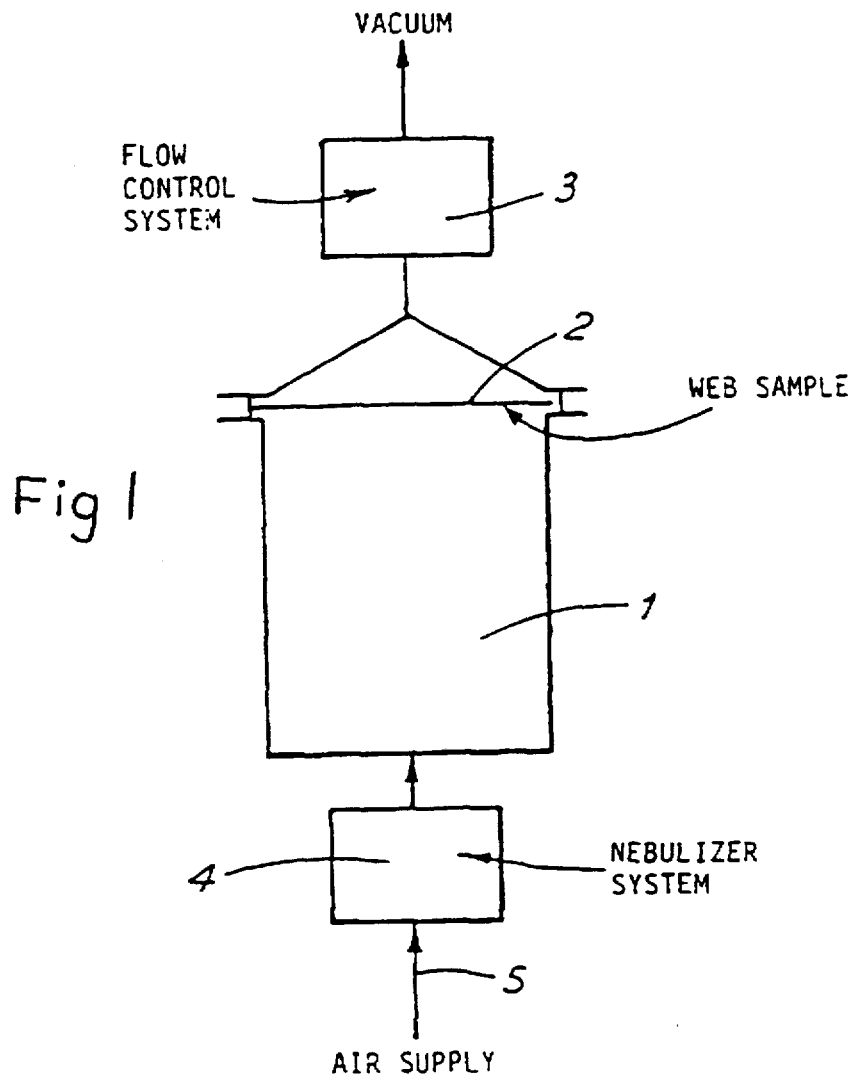
FIG. 1 is a schematic view of apparatus suitable for use in producing products embodying the invention.

The apparatus illustrated in FIG. 1 comprises a treatment chamber 1 in which a sample 2 of material to be treated with a modifying agent is supported as shown. A flow control system 3 serves to establish a pressure differential across the material 2. A Hudson nebuliser 4 associated with an air supply line 5 is provided at the high pressure side. In use of the apparatus, an aerosol of the modifying agent is generated in the nebuliser 4 and is drawn through the material 2 by virtue of the applied vaccum. The modifying agent is selectively located in the larger pores of the material.

This is based on the fact that the flow of the suspension, dispersion or aerosol through the pores of the material being treated is proportional to $r^4$ (where r is pore radius). Consequently there is a significantly greater flow through the pores of large cross-section than through those of small cross-section and the difference in flow ensures that substantially all of the modifying agent is targetted to the larger pores and becomes incorporated therein. It is envisaged that this method may be effected on a continuously moving web of material across which a pressure differential is applied.

The inertial conditions of the modifying process are an important factor in the treatment process. As described more fully below, the use of high inertia results in the pore modifying agent simply remaining on the surface of the material being treated since it is not able to follow the flow pattern into the pores. With conditions of low or medium inertia, the benefits of the invention will be obtained, although the actual properties obtained for the barrier material will depend on the inertia conditions affecting the modifying agent, again as detailed below.

The time for which the material is treated depends on factors such as the pressure differential across the material, the concentration of the modifying agent in the suspension, dispersion or aerosol and the characteristics required. Generally however the desired characteristics are obtained with comparatively short treatment times and using only small amounts of modifying agent. Generally the amount of modifying agent is so small that if it were applied non-selectively, it would have little effect. The selective incorporation can be used to create concentrations of agents. This may be useful e.g. in creating supported catalysts.

Most preferably the modifying agent is used as an aerosol. Such an aerosol may be generated by air dispersal of a solid modifying agent or by aerosolisation of a liquid suspension of the modifying agent. Alternatively it is possible to use an aerosol generated from a liquid or a solution from which the modifying agent is derived. A surface active agent may be used to assist formation of the aerosol.

Advantageously an adhesive agent is used in conjunction with the modifying agent to enhance retention thereof in the pores (unless the agent is itself adhesive). The adhesive (e.g. latex) may be incorporated in the suspension, dispersion or aerosol with which the material is treated. Alternatively the material being treated may already possess an adhesive whose action may be initiated by a physical or chemical process after the material has been treated with modifying agent. The adhesive may be one which is activated by heat.

The inertia conditions of the modifying treatment have been found to affect significantly the properties for the treated material.

The inertia of the modifying agent is directly dependent upon the mass and flow rate of the particles and inversely related to the size of pores of the material being treated.

Embodiments of the invention use a low degree of treatment, so that only a small amount of modifying agent is incorporated. For low inertia treatment (FIG. 2*a*), there is substantially no reduction of maximum pore size with increasing extent of treatment but there may be some reduction of air-permeance. At medium inertia (FIG. 2*b*), there is some reduction of maximum pore size and a reduction of air-permeance greater than that obtained at low inertia treatment. At high inertia (FIG. 2*c*), there is substantially no reduction of air-permeance and substantially no reduction of pore size. This is because of the small amount of modifying agent used. With large amounts (particularly at high inertia), the modifying agent would be impregnated onto and into the top surface to form a dusting or coating, so that pore size and air-permeance would fall. This is because the pore size would then be determined by the size of the pore openings, governed by the nature of the dusting. That is, pores are then clogged at the surface.

The treatment method should be effected such that the particulate material is deposited by Brownian motion capture in a chamber of the pore (as in the idealised representation of FIG. 2*a*) or is impacted on the walls of a constriction of the pores (as depicted in FIG. 2*b*). The option which is preferred will depend on the end use of the product.

The amount of modifying agent incorporated in the material is generally insignificant as compared to original weight thereof (e.g. less than or equal to 1% w/w; possibly up to 10% e.g. for light materials) but nevertheless the selective incorporation in the larger pores of the small amount of agent provides a significant alteration in characteristics. The amounts will typically be comparable to those disclosed and exemplfied in EP-A-0272798, e.g. less than 10 $gm^{-2}$, and usually less than 1 gm–2, e.g. as low as 0.1 $gm^{-2}$ or even less.

Further detail of classes of particulate material (i)–(ix) which may be used in accordance with the invention will now be given.

(i) Particulate materials of this type are intended to modify those properties of the porous material which are governed by the size of the pores (at the upper end of the size range). As such, the porous material should be treated such that at least a significant portion of the particulate material is located on the walls of the pores at, and in the region of, a chamber and/or a constriction therein (see FIGS. 2*a* and 2*b*). The properties of the porous material which may be modified in this way are maximum pore size, pressure to cause "strike-through", liquid filtration properties, grease penetration, conductivity, gas permeance vapour transmission, printability, and coatability. The particulate material can be drawn from a wide range of substances, including at least one of latex, polyurethane, natural and synthetic resins, ethylene-acid acrylic copolymer, ethylene vinyl acetate, chalk, clay, activated carbon, graphite and cellulose.

(ii) Inclusion of a light scattering agent (eg titanium dioxide, polystyrene pigment (ex Dow Chemical Co), zinc oxide and/or china clay) will increase the opacity of the sheet.

(iii) Inclusion of an ion-exchange resin provides filter media which will have useful properties for removing unwanted species.

(iv) Inclusion of catalysts effectively provides supported catalyst systems which may be useful for many chemical reactions.

(v) Incorporation of a pigment, dye or other marking agent (eg colour pigments, inks, agents sensitive to physical and/or chemical stress and UV fluorescent pigments) within the porous structure of the material provides a unique way of marking it. The marking agent may, for example, be a UV fluorescent pigment applied to the material through a mask so as to produce a discrete marking (visible only under UV light). Furthermore, the distribution of the marking agent, which may alternatively be applied over the full area of the porous material, is specific to the structure of the given material. It is therefore comparatively easy to tell whether such marked materials are authentic. The use of such marking agents therefore has application in security papers.

(vi) Incorporation of a particulate agent (eg a thermoplastic material such as a polystyrene pigment or an inorganic pigment such as china clay) in the pores at the upper end of the size range can change the response of a porous material to calendering. This can result in enhanced structural qualities which, in turn, give improved sheet properties including surface quality, web porosity, pore size distribution, surface holdout, coatability and printability.

(vii) Incorporation of an odour removing agent (eg activated carbon) within the material can provide effective removal of odours from gas flowing across or through the material.

(viii) Incorporation of an adhesive agent (eg polyvinylacetate, polyurethane, ethylene-acrylic acid copolymer, latex, ethylene vinyl acetate) can change the adhesion properties of a porous material to control the anchoring and/or release of a second system (eg coating, laminate or material) after an interface has been formed between the porous material and the second system.

(ix) Incorporation of an absorbent agent (e.g. superabsorbent polymer such as sodium polyacrylate, cross-linked) can provide useful properties for removal of liquid.

Figure 2:
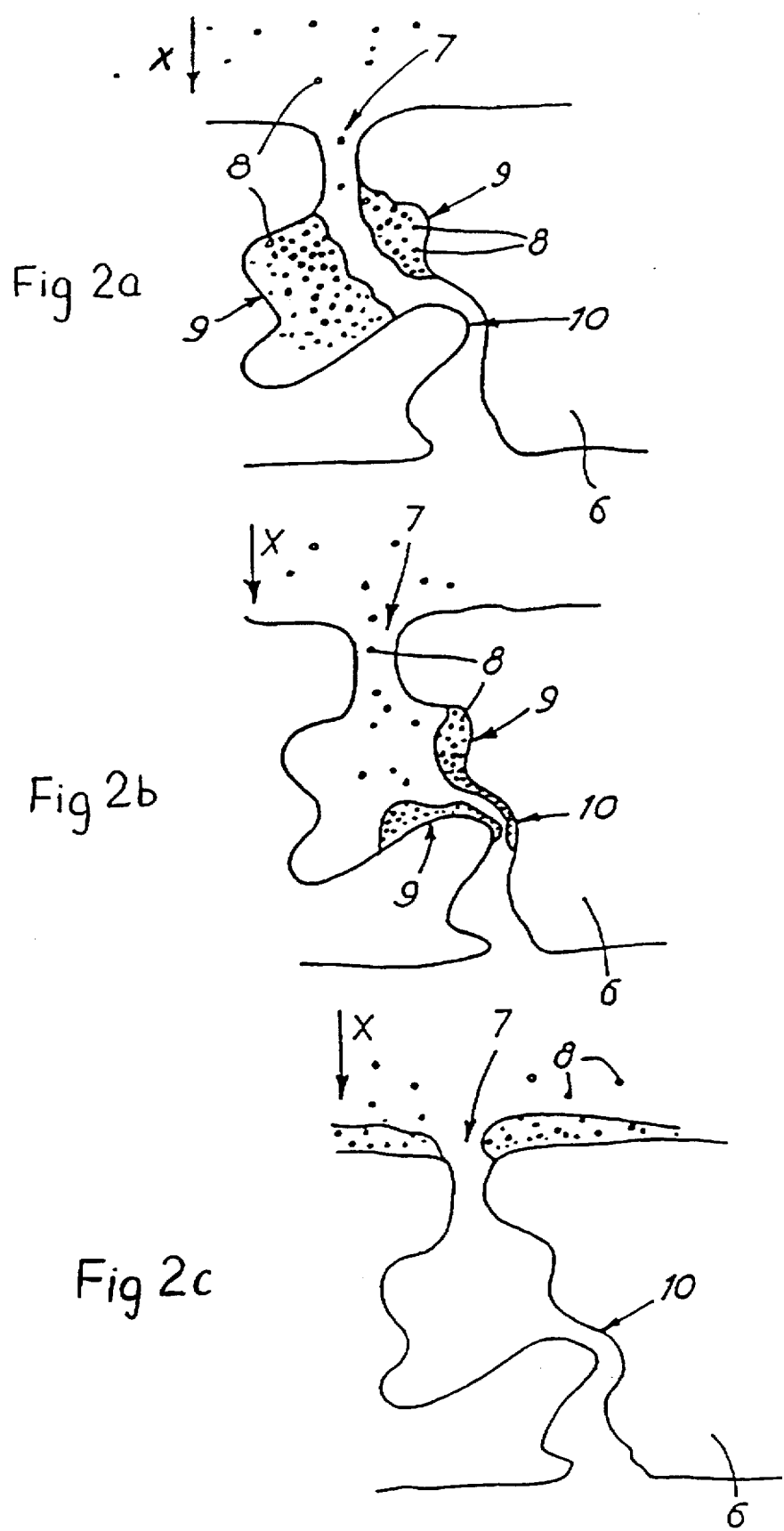
FIG. 2a, 2b and 2c are schematic views showing pores treated under conditions of low, medium and high inertia, respectively.
Figure 3:
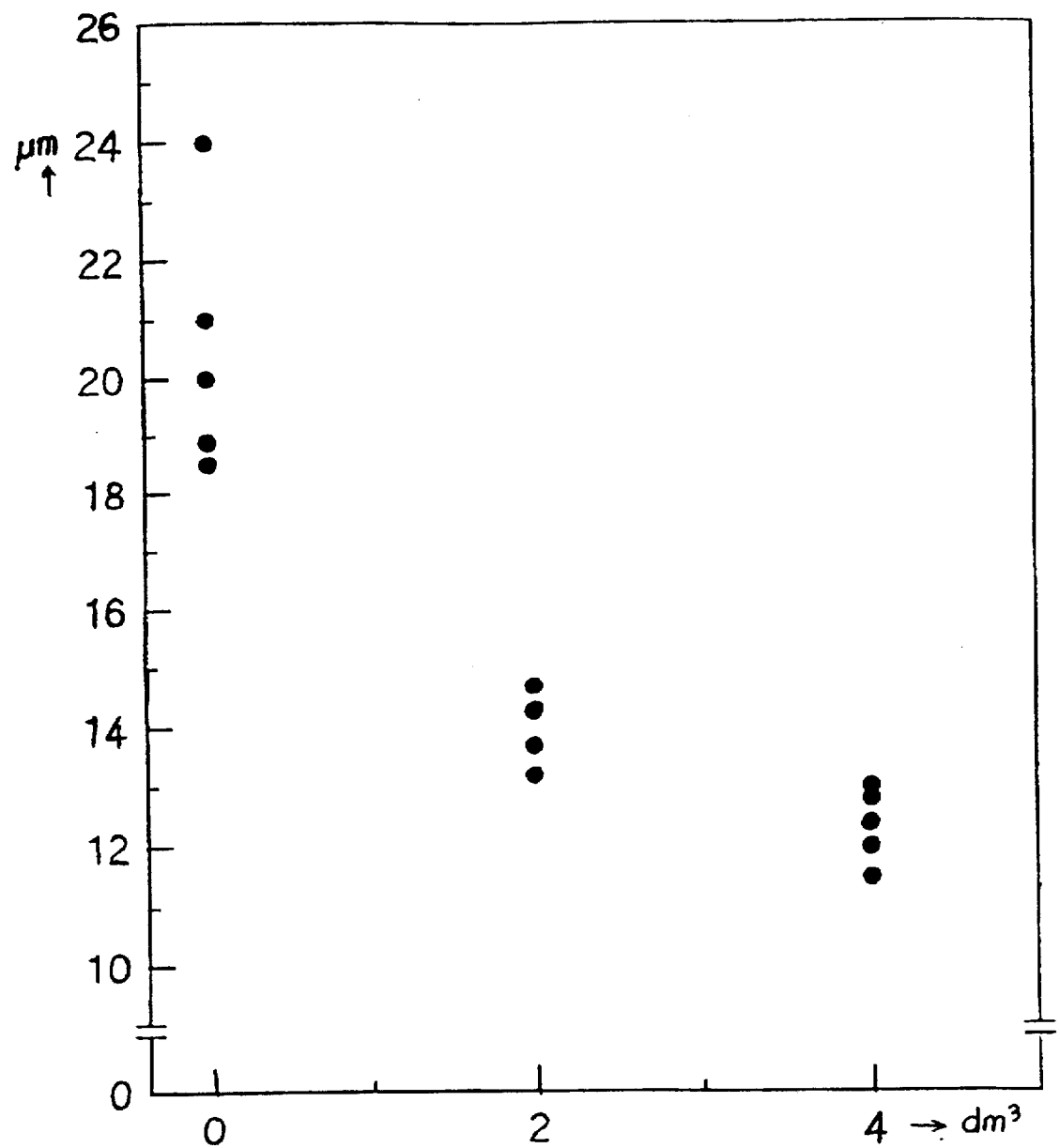
FIG. 3 is a graph of maximum pore size against extent of treatment for webs treated according to an embodiment of the invention.
Figure 4:
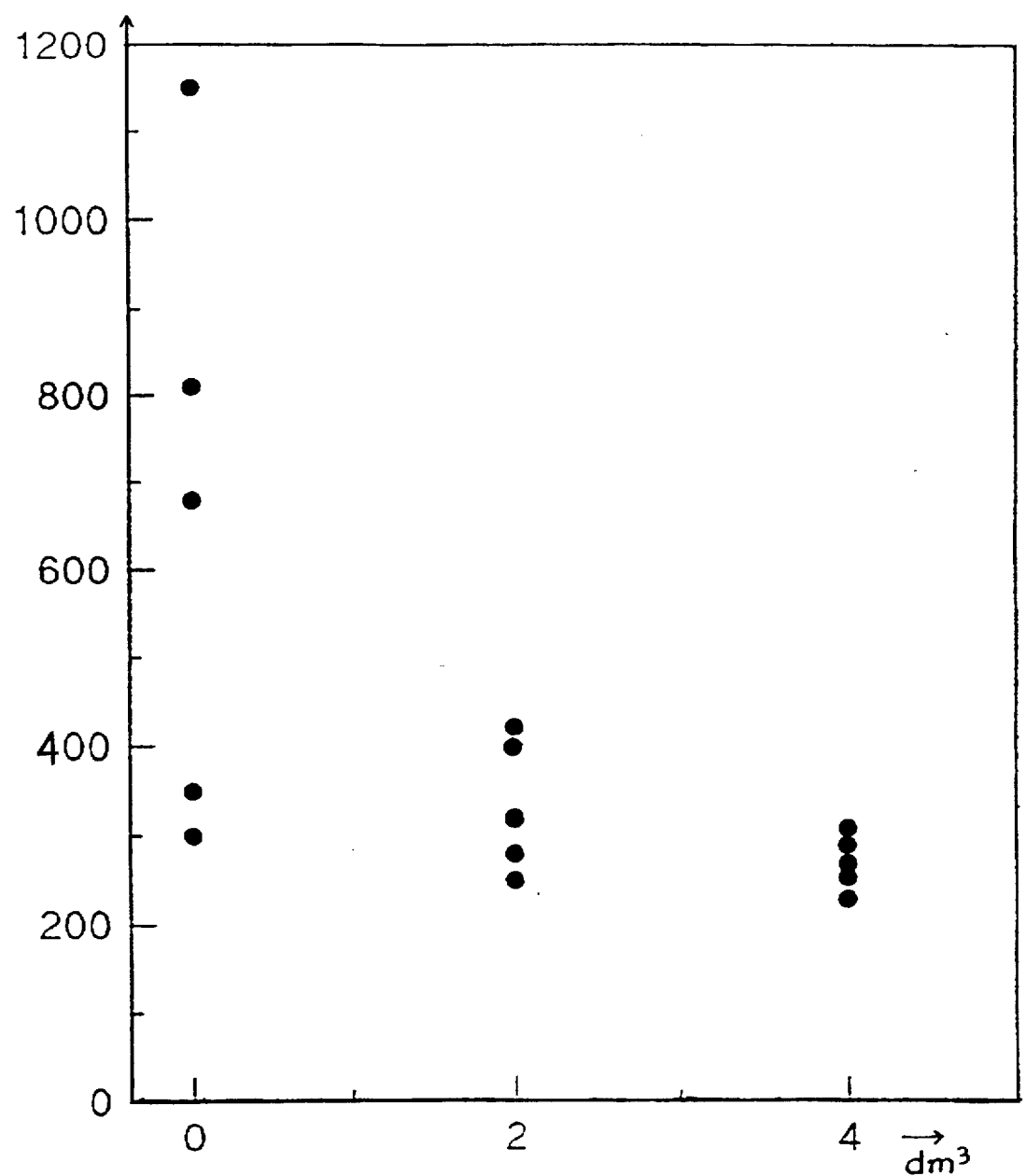
FIG. 4 is a graph related to that of FIG. 3 but shows air permeance in place of maximum pore size.

Particulate materials of the type (ii)–(ix) are preferably deposited in chambers and/or constrictions of the pores at the upper end of the size range (see FIGS. 2a and 2b).

The following examples are provided to illustrate various aspects of the invention. All examples were carried out using the apparatus illustrated in FIG. 1 working under the following conditions:

Input pressure to the nebuliser: 20 psi
Concentration of aerosol: 3 mg $dm^{-3}$
Mean droplet size: of the order of 3 μm
Sample size of aerosol: 78.5 $cm^2$

EXAMPLE 1

Control of Maximum Pore Size and Gas Permeance

This demonstrates the use of the invention to produce reliably uniform webs, with little variation in maximum pore size and gas permeance.

A 40 g $m^{-2}$ polymeric web (designated Web A) of maximum pore size around 18 to 24 μm was treated with an aerosol of a suspension of ethylene vinyl acetate (EVA)(33% w/v) in water.

The method was carried out for varying times at a flow rate of $2\times10^{-2}$ $dm^3$ $min^{-1}$ $cm^{-2}$ across the material using different samples of the material (cut from the same web) so as to give different extents of treatment. FIG. 3 is a plot of maximum pore size (determined using Bubble Point Pressure as described in BS3321:1960) against extent of treatment of Web A with EVA; at each level of treatment, measurements were conducted on five different samples of Web A. It is immediately apparent from FIG. 3 that there is a marked impact on maximum pore size of Web A through the selective incorporation of particulate EVA within the porous structure of the web. Furthermore, the treatment is observed to bring about a significant reduction in sample to sample variability in maximum pore size; this unexpected finding is explained by a reduction in the pore size range (minimum to maximum pore size) consequent upon the selective incorporation of particulate EVA within the pores at the upper end of the size range.

FIG. 4 shows corresponding air permeance data for the samples of Web A treated with particulate EVA. Untreated samples of web A (0 $dm^3$ treatment) are seen to exhibit values of air permeance ranging from around 300 to 1150 Bendtsen. With increasing extent of treatment, the level of air permeance is seen to fall while there is a significant improvement in uniformity of air permeance from sample to sample. The dramatic impact on air permeance of treating Web A with EVA in the manner described above is again brought about through changes in pore size distribution consequent upon the selective incorporation of particulate EVA within the pores at the upper end of the size distribution. Clearly, it is the random occurrence of large pores within the samples taken from the web that contributes to the level of sample to sample variability.

EXAMPLE 2

Control of Pressure to Cause Liquid to Pass Through Porous Material

Example 2 demonstrates control of pressure to cause liquid water to pass through porous web material by means of change in pore size distribution. The minimum pressure to cause liquid water to pass through web materials is designated hydrostatic head; the method of determination of hydrostatic head is described in AATCC test method 127-1980. A 45 g $m^{-2}$ paper (Web B) of air permeance of around 400 Bendtsen was treated with an aerosol of particulate ethylene-acrylic acid copolymer (EAA)(20% w/v) in water. The method of treatment was generally as in Example 1.

Table 1 lists values of air permeance, maximum pore size and hydrostatic head of Web B treated with EAA.

TABLE 1

| Extent of Treatment(s) | Air Permeance (Bendtsen) | Maximum Pore size (μm) | Hydrostatic Head (cm water) |
|---|---|---|---|
| 0 | 374 | 32.0 | 30 |
| 30 | 297 | 17.3 | 60 |
| 60 | 269 | 12.5 | 67 |

The principal effect of the selective incorporation of particulate material within pores at the upper end of the pore size distribution is a change in pore size distribution. In Example 2, the change in pore size distribution of Web B is evidenced through a reduction in both air permeance and maximum pore size together with an increase in hydrostatic head.

The magnitude of the increase in hydrostatic head of Web B reflects the impact of selective incorporation of particulate EAA into pores at the upper end of the size distribution.

EXAMPLE 3

Control of Liquid Filtration Properties of Porous Materials

Porous web materials act to stop the passage of liquid borne particles through a direct "sieve-like" action; consequently, a liquid borne particle on encountering a pore will not pass through it if the particle size exceeds that of the pore size. Example 3 illustrates the impact of targeting particulate material to pores at the upper end of the pore size distribution on liquid filtration properties.

Three cellulosic webs (C through E) and synthetic web (F) were treated with a particulate latex agent in the manner described in Example 1; the composition of the latex suspension was: latex, 30% w/v; water, to 100%

All samples were treated for 60s. Treated and untreated samples of the four different web materials were subjected to assessments of liquid filtration properties together with measurements of maximum pore size. In practice, each measurement of liquid filtration property involves challenging a 47 mm diameter sample with a 100 ml aqueous suspension of test micro-organisms (of the order of $10^5$ organisms per $cm^3$); standard laboratory techniques were employed to determine the percentage penetration of the microbial challenge.

Table 2 lists values of maximum pore size together with liquid filtration properties as measured by percent penetration for treated and untreated samples of the four web materials.

TABLE 2

| Web Material | Untreated | | Treated | |
|---|---|---|---|---|
| | Max Pore Size (μm) | % Penetration (Filtration Eff.) | Max Pore Size (μm) | % Penetration (Filtration Eff.) |
| C | 28.2 | 64 | 3.8 | 24 |
| D | 5.9 | 43 | 2.3 | 14 |
| E | 4.9 | 23 | 3.0 | 10 |
| F | 33.9 | 94 | 8.9 | 27 |

As in the previous two examples, the selective incorporation of particulate material into pores at the upper end of the size range brings about a marked change in the pore size distribution of the four web materials. The extent of this change, as evidenced by a reduction in maximum pore size, ranges from 1.6 fold for Web E to 7.4 fold for Web C. Consequent upon the change in pore size distribution, there is a corresponding decrease in percentage penetration of the liquid borne challenge micro-organisms. The extent of the observed improvement in filtration properties ranges from 1.6 fold for Web E up to 3.5 fold for Web F. Clearly, pores at the upper end of the size distribution impact significantly upon the liquid filtration properties of a porous web, and the selective incorporation of particulate agent within pores provides a unique approach to improving liquid filtration properties.

EXAMPLE 4

Incorporation of a Light Scattering Agent

Optical properties (including opacity, gloss, reflectance and brightness) of a porous web material are determined, in part, by the light scattering characteristics of the web. For a porous web under illumination, the light striking the surfaces of fibres surrounding pores is diffused; for a given pore, the extent of light diffusion is governed by the ratio of the surface area of the fibres surrounding the pore to pore void volume. Thus in a small pore with a high surface to volume ratio, light diffuses to a greater extent than for a large pore with a low surface to volume ratio.

Example 4 demonstrates the impact on the optical properties of a porous web material by incorporating a particulate light scattering agent into pores at the upper end of the size range. A 45 g $m^{-2}$ $^{web}$ (Web G) was treated (15s) with an aerosol of china clay in the manner described in Example 1; the composition of the china clay suspension was:

| China clay | 5% w/v |
|---|---|
| Dispersant | 0.5% w/v |
| Water | to 100% |

The opacity of Web G was measured in accordance with BS4432 (1969), before and after treatment. The values were 88.7% and 90.7% respectively. Thus there is a pronounced increase in the opacity of the porous web. (Even a 2% increase in opacity for a web of around 89% opacity would be a notable improvement.) Clearly, the selective incorporation of a particulate light scattering agent into pores at the upper end of the size range enhances the overall opacity of a porous web.

EXAMPLE 5

Incorporation of an Agent to Enhance the Response of a Porous Material to Calendering Calendering is a widely used mechanical process in which a material is passed through a nip generally formed between two rollers. Calendering is applied to porous web material to enhance certain qualities consequent upon web consolidation; these qualities include surface smoothness and qualities reflecting a reduction in web porosity (eg pore size distribution, surface holdout, printability and coatability). The level of calendering is influenced through control of nip pressure, temperature and hardness of rollers comprising the nip.

Laboratory work has demonstrated that incorporation of a particulate agent into pores at the upper end of the size distribution enhances the response of porous material to calendering. A 40 g $m^{-2}$ paper (Web H) has been chosen to exemplify the enhancement of the calendering response. The web was treated with two different agents; the compositions of the agents were:

(1) China clay 7% w/v

Dispersant/Binder 10% w/v

Water to 100%

(2) Polystyrene polymer 5% w/v

Dispersant/Binder 10% w/v

Water to 100%

Samples of Web H were treated (60s) with either agent 1 or agent 2 in the manner described in Example 1. Treated and untreated samples were calendered at a pressure of 420 pli (75 Kg/cm) and a temperature of 90° C.

Table 3 gives pore size data (minimum, mean and maximum pore size) for untreated and treated samples of Web H, before and after calendering.

TABLE 3

| Web H | Uncalendered Pore Size (μm) | | | Calendered Pore Size (μm) | | |
|---|---|---|---|---|---|---|
| | Min | Mean | Max | Min | Mean | Max |
| Untreated | 8 | 16 | 34 | 6 | 10 | 16 |
| Treated, Agent 1 | 8 | 13 | 24 | 1.5 | 2.1 | 3.0 |
| Treated, Agent 2 | 7 | 10 | 18 | 0.9 | 1.4 | 1.8 |

Data for untreated samples show the expected web response to calendering; there is a significant reduction in pore size distribution as indicated by minimum, mean and maximum pore size. In keeping with the previous findings described above, incorporation of a particulate agent into pores at the upper end of the size distribution results primarily in a reduction in maximum pore size (the apparent reduction in mean pore size is a reflection of the reduction in maximum pore size). However, on calendering Web H treated with either of the particulate agents (1) or (2), there is a dramatic reduction in minimum, medium and maxium pore sizes. The magnitude of the response to calendering, as shown by pore size distribution, is substantially greater for treated Web H as opposed to untreated Web H. This unexpected finding is explained by a change in the collapse behaviour of a porous material during calendering consequent upon incorporation of particulate agent in pores at the upper end of the size distribution. This change in collapse behaviour provides a porous web material of enhanced structural qualities in respect of pore size distribution and, in consequence, enhanced performance in respect of coatability, printability and other web properties governed by pore size distribution.

EXAMPLE 6

Incorporation of a Pigment, Dye or Other Marking Agent

Example 6 demonstrates the unique marking of a porous material by the selective incorporation of an appropriate agent in pores at the upper end of the size range.

A 52 g m$^{-2}$ polymeric web (designated Web J) was treated (60s) with an aerosol of an aqueous suspension of a UV pigment (5% in water to 100%) in the manner described in Example 1.

Figure 5:
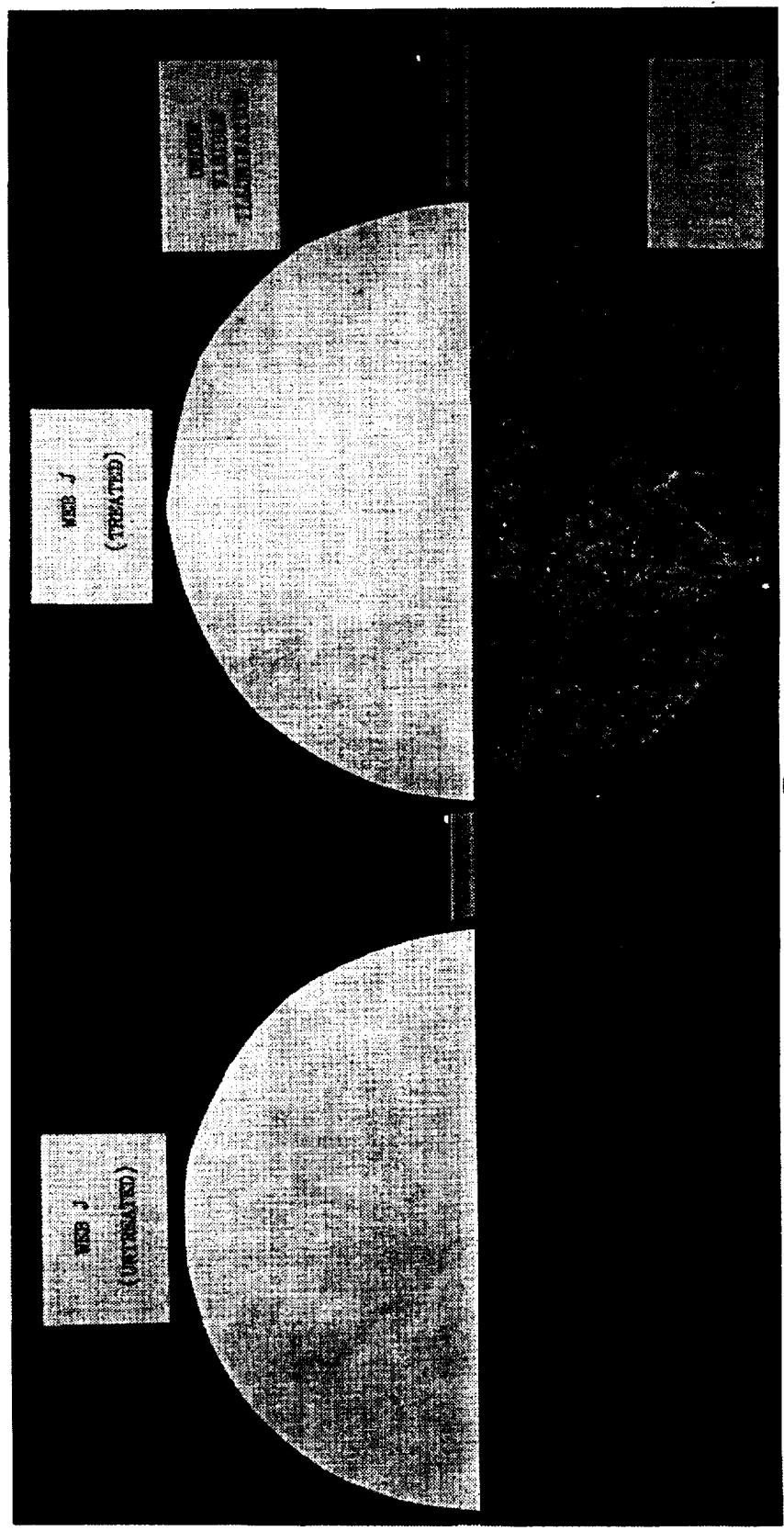
FIG. 5 illustrates samples of webs with and without treatment with a UV pigment by a method embodying the invention, as viewed under normal and UV light.

Under visible light, untreated and treated samples of Web J appear identical. However, under UV illumination, treated samples are readily distinguished from untreated samples. FIG. 5 presents views of untreated and treated samples of Web J under visible and UV illumination. Clearly, the selective incorporation of a marking agent within pores at the upper end of the size range provides an identifying mark that reflects the pore structure of the porous web material. This identifying mark, or characteristic appearance, could be used to great effect where security from forgery is required. A forger would have to apply UV pigment in the same manner, and to use a web of similar structure.

EXAMPLE 7

Control of the Adhesive Properties of the Surface of a Porous Material

Laboratory work has demonstrated that the selective incorporation of an adhesive agent within pores at the upper end of the size range can change the adhesion properties of a porous material to control the anchoring and/or release of a second system (eg coating, laminate or material) after an interface has been formed between the porous material and the second system.

In Example 7, a 48 g m$^{-2}$ cellulosic web (designated Web K) was treated with an aerosol of particulate ethylene-acrylic acid copolymer (EAA). The method of treatment was generally a repeat of Example 1, with the dispersion of copolymer having the composition: EAA, 50%; water to 100%.

Untreated and treated samples of Web K were coated with 6 g m$^{-2}$ (dry weight) of a styrene-butadiene latex dispersion. Following coating, the samples were sealed to a standard material employing a standard in-house method. An Instron seal tester was used to measure the force required to break the interface bond between Web K and the coating; thus breaking force is regularly referred to as seal strength.

Figure 6:
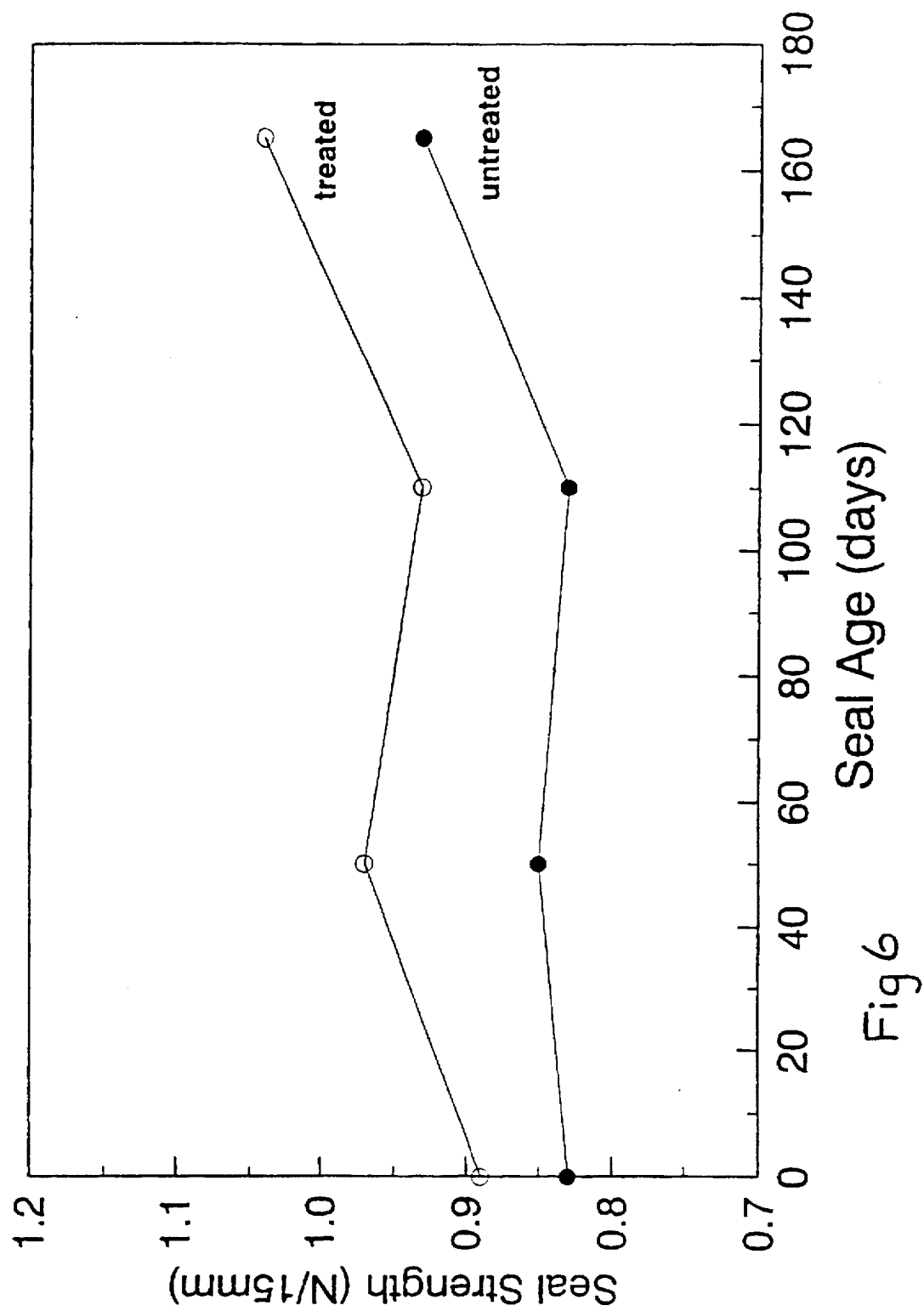
FIG. 6 is a graph of seal age against seal strength showing the effect of incorporating adhesive by a process embodying the invention.

FIG. 6 shows values of seal strength for untreated and treated samples of Web K as a function of seal age. In all instances, for a given seal age, the seal strength of treated Web K is greater than that of untreated Web K. Clearly, a significant increase in the seal strength can be effected through the incorporation of adhesive particles in the pores at the upper end of the size range. The magnitude, and direction, of change in adhesion properties of the surface of the porous material can be controlled by the agent type and extent of treatment.

We claim:

1. A method of modifying a web of porous material comprising providing a substrate web of porous material having pores with a range of sizes; and treating at least a part of the material with a particulate material agent under conditions such that the agent is selectively incorporated in a minor portion of the total number of the pores, said minor portion being at the upper half of the size range; and wherein the material agent is selected from particulate materials which, when selectively incorporated, affect at least one property of the web selected from:

(i) ion exchange properties, the agent being an ion exchange resin;

(ii) catalytic properties, the agent being a catalyst;

(iii) detectable marking or colouring, the agent being a pigment, dye, or other marking agent;

(iv) deoderising ability, the agent being an odour removing agent;

(v) absorption properties, the agent being an absorbent agent;

(vi) conductivity.

2. A method according to claim 1 wherein said step of treating the material comprises establishing a pressure differential across the material so that the material has a relatively high pressure side and a relatively low pressure side and supplying a suspension or dispersion of the particulate material agent in a carrier fluid to the high pressure side.

3. A method according to claim 2 wherein the treatment employs a carrier gas and conditions are selected to be such that the agent is carried into said minor portion of the total pores.

4. A method as claimed in claim 1 wherein the porous material has a pore size range defined by a log-normal distribution.

5. A method as claimed in claim 1 wherein the porous material is a wet-laid material.

6. A method as claimed in claim 1 wherein the porous material is a non wet-laid material.

7. A method as claimed in claim 1 wherein the particulate material is provided only over a part of the area of the porous material.

8. A method as claimed in claim 1 wherein the particulate material is a pigment, dye or other marking agent.

9. A method as claimed in claim 8 wherein the particulate material is a UV fluorescent pigment.

10. A material as claimed in claim 1 wherein the particulate method modifies liquid absorption prosperities of the web.

11. A method according to claim 1 including a subsequent step selected from:

printing;

coating;

calendering optionally followed by printing or coating;

use as a filter medium;

use as a supported catalyst;

visualisation of UV fluorescent particulate material agent;

adhesion to a web, film or coating;

use as an absorption medium.

12. A method according to claim 2 wherein the carrier fluid is a gas.

13. A method of modifying a web of porous material comprising providing a substrate web of porous material having pores with a range of sizes; and treating at least a part of the material with a particulate agent under conditions such that the agent is selectively incorporated in a minor portion of the total number of the pores, said minor portion being at the upper half of the size range; and subsequently calendaring the web; and wherein the particulate material modifies the smoothness or porosity as a response to calendaring; such that calendaring of the web causes a reduction in pore size which is greater than for a corresponding calendared web which has not been treated with said particulate material agent.

* * * * *